(No Model.)
T. W. HENTZ.
FRUIT GATHERER.
No. 261,153. Patented July 18, 1882.
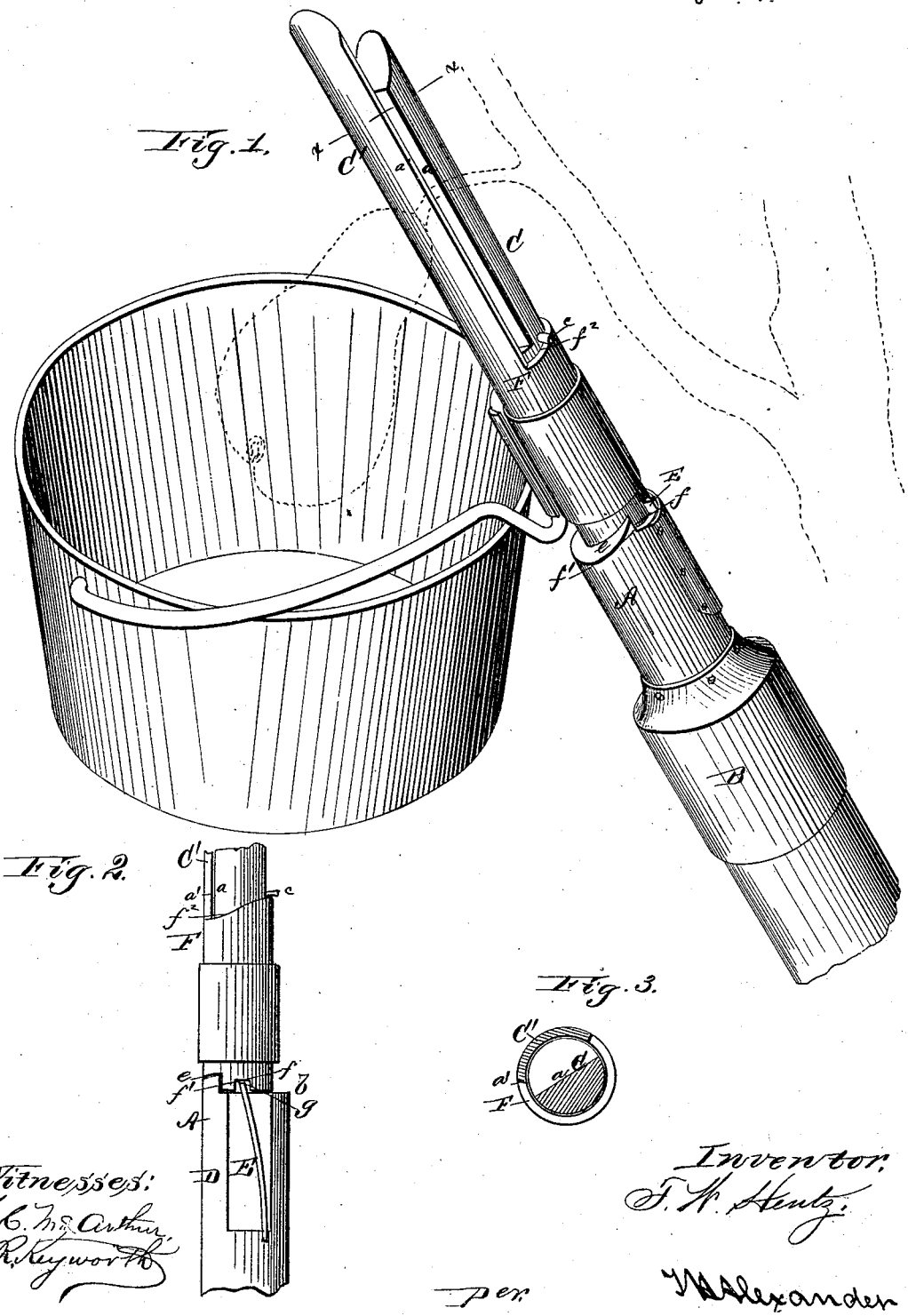

UNITED STATES PATENT OFFICE.

THADDEUS W. HENTZ, OF MARIANNA, FLORIDA.

FRUIT-GATHERER.

SPECIFICATION forming part of Letters Patent No. 261,153, dated July 18, 1882.

Application filed May 10, 1882. (No model.)

*To all whom it may concern:*

Be it known that I, THADDEUS W. HENTZ, of Marianna, in the county of Jackson and State of Florida, have invented certain new and useful Improvements in Fruit-Gatherers; and I do hereby declare that the following is a full, clear, and exact description thereof, reference being had to the accompanying drawings, and to the letters of reference marked thereon, which form part of this specification, in which—

Figure 1 is a perspective view of my fruit-gatherer. Fig. 2 is a side elevation of my cutting mechanism; and Fig. 3 is a cross-section on the line $x\ x$, Fig. 1.

This invention relates to implements for gathering fruit; and the nature of my invention consists in the combination of a cutting-fork formed of a blade which is rigid on the socket-section of a pole and a blade which is rigid on a tubular section that is acted on by a spring, as will be fully understood from the following description, when taken in connection with the annexed drawings.

The letter A designates a short cylindrical bar, on one end of which a socket, B, is formed to receive the end of a long pole. On the opposite end of the bar A is a cutting-blade, C, having a straight edge, $a$, which, with the aid of a cutting-edge, $a'$, formed on a blade, C', is designed for cutting the twigs to which the fruit is attached. The blade C is formed on a rounded shank, D, having an oblique shoulder, $b$, from which protrudes the free end of a strong spring, E, that is suitably secured in a recess made in one side of the bar A. The cutting-blade C' is formed on a tubular shank, F, which is free to oscillate on the shank D, and which is held thereon by means of a pin, $c$. The lower end of the tubular shank F is oblique to its longitudinal axis, as shown at $e$, and is also formed with an abutment, $f$, which is held against a corresponding abutment, $f'$, on the bar A by means of the spring E, which enters a notch, $g$, in the lower oblique or beveled end of the shank F. The upper end of the shank against which the pin $c$ presses is beveled, as shown at $f^2$.

G designates a tube, which is fitted on the shank F and attached to the bail of a bucket or other suitable receptacle for catching the fruit as it is severed from the branches.

The operation of the device is as follows: The stem or twig of the fruit is adjusted in the crotch between the two blades C C', and the implement is turned slightly about its long axis. This movement causes the cutting-edges of the blades to come together, and at the same time gives an endwise movement to the blade C', by reason of the oblique or beveled parts sliding one on the other, thus producing a drawing or shear cut and severing the twig. The spring E will then separate the blades, ready for another operation. The blade C on the bar A is actually the movable blade, while the blade C' is confined to the bail of the bucket.

It will be seen that I render unnecessary the use of two poles or the combination of levers and the devices necessary for operating them, which are very inconvenient in manipulating the gatherers hitherto constructed. With my new gatherer a pole may be of any length, and the fruit is detached from the branches of the tree by a slight turn of the pole.

Having described my invention, I claim—

1. A fruit-gatherer consisting of the cutting-blades C C', the blade C being rigid on the bar A and the blade C' allowed to oscillate and at the same time caused to move endwise, in combination with a spring applied to the shank of blade C', all substantially as and for the purposes described.

2. The combination, in a fruit-gatherer, of the blade C, rigid on bar A, the blade C', movable thereon, the beveled abutting surfaces $b$ $e f^2$, pin $c$, and the spring E, all arranged for joint operation, substantially in the manner described.

In testimony that I claim the foregoing as my own I affix my signature in presence of two witnesses.

THADDEUS W. HENTZ.

Witnesses:
H. D. HILL,
J. W. RUSS, Jr.